United States Patent
Ghosh et al.

(10) Patent No.: US 10,324,749 B2
(45) Date of Patent: *Jun. 18, 2019

(54) OPTIMIZING RUNTIME PERFORMANCE OF AN APPLICATION WORKLOAD BY MINIMIZING NETWORK INPUT/OUTPUT COMMUNICATIONS BETWEEN VIRTUAL MACHINES ON DIFFERENT CLOUDS IN A HYBRID CLOUD TOPOLOGY DURING CLOUD BURSTING

(71) Applicant: International Business Machines Corporation, Armonk, NY (US)

(72) Inventors: Rahul Ghosh, Morrisville, NC (US); Giribabu V. Paramkusham, Morrisville, NC (US); Aaron J. Quirk, Cary, NC (US); Upendra Sharma, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/896,709

(22) Filed: Feb. 14, 2018

(65) Prior Publication Data
US 2018/0173556 A1 Jun. 21, 2018

Related U.S. Application Data

(63) Continuation of application No. 14/609,823, filed on Jan. 30, 2015, now Pat. No. 9,983,895, which is a
(Continued)

(51) Int. Cl.
*G06F 9/455* (2018.01)
*H04L 12/26* (2006.01)
(Continued)

(52) U.S. Cl.
CPC ...... *G06F 9/45558* (2013.01); *G06F 9/45533* (2013.01); *G06F 9/4856* (2013.01);
(Continued)

(58) Field of Classification Search
CPC .................................................. G06F 9/45533
(Continued)

(56) References Cited

U.S. PATENT DOCUMENTS

| | | | | |
|---|---|---|---|---|
| 6,601,098 B1 * | 7/2003 | Case | .................. | H04L 29/12009 370/253 |
| 8,102,781 B2 * | 1/2012 | Smith | .................... | G06F 9/4856 370/252 |

(Continued)

OTHER PUBLICATIONS

Guo et al., "Seagull: Intelligent Cloud Bursting for Enterprise Applications," https://www.usenix.org/system/files/conference/atc12/atc12-final57.pdf, Usenix Annual Technical Conference, Jun. 2012, pp. 1-6.
(Continued)

*Primary Examiner* — Mehran Kamran
(74) *Attorney, Agent, or Firm* — Robert A. Voigt, Jr.; Winstead, P.C.

(57) ABSTRACT

A method, system and computer program product for optimizing runtime performance of an application workload. Network input/output (I/O) operations between virtual machines of a pattern of virtual machines servicing the application workload in a private cloud are measured over a period of time and depicted in a histogram. A score is generated for each virtual machine or group of virtual machines in the pattern of virtual machines based on which range in the ranges of I/O operations per seconds (IOPS) depicted in the histogram has the largest sample size and the number of virtual machines in the same pattern that are allowed to be in the public cloud. In this manner, the runtime performance of the application workload is improved by
(Continued)

minimizing the network input/output communications between the two cloud environments by migrating those virtual machine(s) or group(s) of virtual machines with a score that exceeds a threshold value.

4 Claims, 8 Drawing Sheets

Related U.S. Application Data continuation of application No. 14/308,418, filed on Jun. 18, 2014, now Pat. No. 9,411,626.

(51) Int. Cl.
*G06F 9/48* (2006.01)
*H04L 29/08* (2006.01)
*G06F 9/50* (2006.01)

(52) U.S. Cl.
CPC .......... *G06F 9/5077* (2013.01); *G06F 9/5088* (2013.01); *H04L 43/0888* (2013.01); *H04L 67/10* (2013.01); *G06F 2009/4557* (2013.01); *G06F 2009/45579* (2013.01); *G06F 2209/501* (2013.01); *G06F 2209/508* (2013.01)

(58) Field of Classification Search
USPC ............................................................ 718/1
See application file for complete search history.

(56) References Cited

U.S. PATENT DOCUMENTS

| | | | | |
|---|---|---|---|---|
| 8,566,483 B1* | 10/2013 | Chen | ................. | G06F 3/0605 710/18 |
| 8,838,841 B2* | 9/2014 | Guyot | ................. | G11B 5/5547 710/58 |
| 8,903,995 B1* | 12/2014 | Basak | ................. | H04L 43/08 709/224 |
| 8,935,500 B1* | 1/2015 | Gulati | ................. | G06F 3/0613 711/114 |
| 8,949,483 B1* | 2/2015 | Martin | ................. | G06F 3/0653 710/15 |
| 8,954,979 B1* | 2/2015 | Myers | ................. | G06F 9/5083 718/104 |
| 8,959,513 B1* | 2/2015 | Swaminathan | ......... | G06F 9/505 718/1 |
| 9,052,830 B1* | 6/2015 | Marshak | ................. | G06F 3/064 |
| 2005/0177344 A1* | 8/2005 | Khaleel | ................. | G06F 11/3404 702/186 |
| 2008/0046960 A1* | 2/2008 | Bade | ................. | G06F 9/4856 726/1 |
| 2008/0195404 A1* | 8/2008 | Chron | ................. | G06Q 10/06 705/1.1 |
| 2009/0310491 A1* | 12/2009 | Ginsberg | ................. | H04L 43/026 370/241 |
| 2011/0276951 A1 | 11/2011 | Jain | | |
| 2012/0011254 A1* | 1/2012 | Jamjoom | ................. | G06F 9/4856 709/226 |
| 2012/0054367 A1* | 3/2012 | Ramakrishnan | ...... | G06F 9/4856 709/242 |
| 2012/0096134 A1* | 4/2012 | Suit | ................. | G06F 9/5072 709/221 |
| 2012/0096460 A1* | 4/2012 | Sekiguchi | ........... | G06F 9/45558 718/1 |
| 2012/0102190 A1* | 4/2012 | Durham | ................. | H04L 41/0823 709/224 |
| 2012/0131196 A1* | 5/2012 | Yamada | ................. | G06F 11/3485 709/226 |
| 2012/0136909 A1* | 5/2012 | Wang | ................. | G06F 21/552 708/204 |
| 2012/0284398 A1* | 11/2012 | Durham | ................. | H04L 41/0823 709/224 |
| 2012/0324445 A1* | 12/2012 | Dow | ................. | G06F 9/45504 718/1 |
| 2013/0212578 A1* | 8/2013 | Garg | ................. | H04L 43/0882 718/1 |
| 2013/0227111 A1* | 8/2013 | Wright | ................. | G06F 9/5083 709/223 |
| 2013/0346572 A1 | 12/2013 | Jain et al. | | |
| 2014/0089921 A1* | 3/2014 | Yang | ................. | G06F 9/45558 718/1 |
| 2014/0130055 A1* | 5/2014 | Guha | ................. | G06F 3/0604 718/104 |
| 2014/0196037 A1* | 7/2014 | Gopalan | ................. | G06F 9/4856 718/1 |
| 2014/0280488 A1* | 9/2014 | Voit | ................. | H04L 67/10 709/203 |
| 2014/0298349 A1* | 10/2014 | Jackson | ................. | G06Q 50/06 718/104 |
| 2015/0040017 A1* | 2/2015 | Roche | ................. | G06F 11/32 715/736 |
| 2015/0121020 A1* | 4/2015 | Bita | ................. | G06F 3/0613 711/158 |
| 2015/0156131 A1* | 6/2015 | Pomerantz | ................. | H04L 47/70 709/226 |
| 2016/0072669 A1* | 3/2016 | Saavedra | ........... | H04L 12/2867 709/220 |
| 2017/0302542 A1* | 10/2017 | Ruan | ................. | H04L 43/04 |

OTHER PUBLICATIONS

Mell et al., "The NIST Definition of Cloud Computing," Special Publication 800-145, Sep. 2011, pp. 1-7.
Office Action for U.S. Appl. No. 15/152,734 dated Apr. 12, 2018, pp. 1-30.
List of IBM Patents or Patent Applications Treated as Related, Feb. 14, 2018, pp. 1-2.

* cited by examiner

OPTIMIZING RUNTIME PERFORMANCE OF AN APPLICATION WORKLOAD BY MINIMIZING NETWORK INPUT/OUTPUT COMMUNICATIONS BETWEEN VIRTUAL MACHINES ON DIFFERENT CLOUDS IN A HYBRID CLOUD TOPOLOGY DURING CLOUD BURSTING

TECHNICAL FIELD

The present invention relates generally to cloud computing, and more particularly to optimizing runtime performance of an application workload by minimizing network input/output communications between virtual machines on different clouds in a hybrid cloud topology during cloud bursting.

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services.

The cloud computing environment may be deployed in a "hybrid cloud" topology, which is composed of two or more clouds, such as a private cloud and a public cloud, that remain distinct entities but are bound together by standardized or proprietary technology that enables data and application portability (e.g., cloud bursting for load balancing between clouds).

In the hybrid cloud topology, "cloud bursting" or "capacity scale out" may occur when an application workload (referring to the amount of processing that a hardware component has been given to do at a given time) experiences a peak load condition. "Cloud bursting" or "capacity scale out" refers to adding additional capacity, such as on the public cloud, to service the application workload. For example, in the hybrid cloud topology consisting of a private cloud and a public cloud, the private cloud may be running low on resources or needs to reserve the resources to service another higher priority workload. As a result, additional resources, such as servers to run virtual machines, may need to be utilized on the public cloud to help service the application workload. When a workload scales out to public cloud resources, a portion of the workload may be running in the private cloud and another portion of the workload may be running in the public cloud. Virtual machines servicing such a workload that are running in the public cloud will likely need to communicate with the virtual machines in the private cloud in order to complete request transactions. This cross-cloud communication (network input/output communications between the virtual machines on different clouds) is not ideal because the external link between the public/private clouds is slower and less reliable than internal links within a cloud thereby diminishing runtime performance for the application workload.

Unfortunately, there is not currently a means for minimizing the network input/output communications between the two cloud environments (i.e., the private and public clouds) during "cloud bursting" or "capacity scale out" to optimize runtime performance of the application workload.

SUMMARY

In one embodiment of the present invention, a method for optimizing runtime performance of an application workload in a hybrid cloud topology comprises measuring network input/output (I/O) operations between virtual machines of a pattern of virtual machines servicing the application workload in a private cloud over a period of time. The method further comprises generating, by a processor, a score for each of a plurality of virtual machines or for each group of a plurality of groups of virtual machines in the pattern of virtual machines used to service the application workload based on a highest number of samples within a range of I/O operations per second using the measured network I/O operations and a number of virtual machines in the pattern of virtual machines that are allowed to be in a public cloud. The method additionally comprises ranking each of the plurality of virtual machines or each group of the plurality of groups of virtual machines in the pattern of virtual machines based on the score. In addition, the method comprises migrating one or more of the plurality of virtual machines or one or more groups of the plurality of groups of virtual machines in the pattern of virtual machines to the public cloud to service the application workload in response to the score for the one or more of the plurality of virtual machines or for the one or more groups of the plurality of groups of virtual machines in the pattern of virtual machines exceeding a threshold value.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
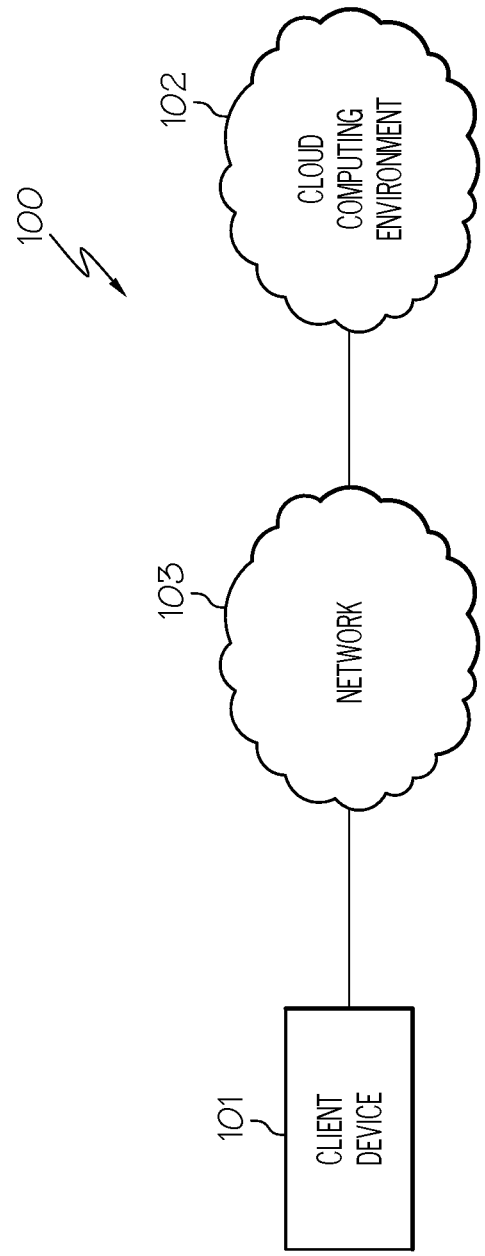
FIG. 1 illustrates a network system configured in accordance with an embodiment of the present invention.

The present invention comprises a method, system and computer program product for optimizing runtime performance of an application workload. In one embodiment of the present invention, network input/output (I/O) operations between virtual machines of a pattern of virtual machines servicing the application workload in a private cloud are measured over a period of time. A histogram of the I/O usage is generated based on the measured network I/O operations for each virtual machine or group of virtual machines in the pattern of virtual machines used to service the application workload. A score is generated for each virtual machine or group of virtual machines in the pattern of virtual machines based on which range in the ranges of I/O operations per seconds (IOPS) depicted in the histogram has the largest sample size and the number of virtual machines in the same pattern that are allowed to be in the public cloud. Such a score is used to identify the candidate virtual machine(s) or group(s) of virtual machines with the highest I/O rates as well as those that interact with each other the most to be migrated to the public cloud. After ranking the workload virtual machines or groups of workload virtual machines based on the score assigned to them in descending order, the virtual machine(s) or group(s) of virtual machines with an assigned score that exceeds a threshold value are migrated to the public cloud to service the application workload. In this manner, the runtime performance of the application workload is improved by minimizing the network input/output communications between the two cloud environments by migrating those virtual machine(s) or group(s) of virtual machines with the highest I/O rates as well as those that interact with each other the most to the public cloud.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
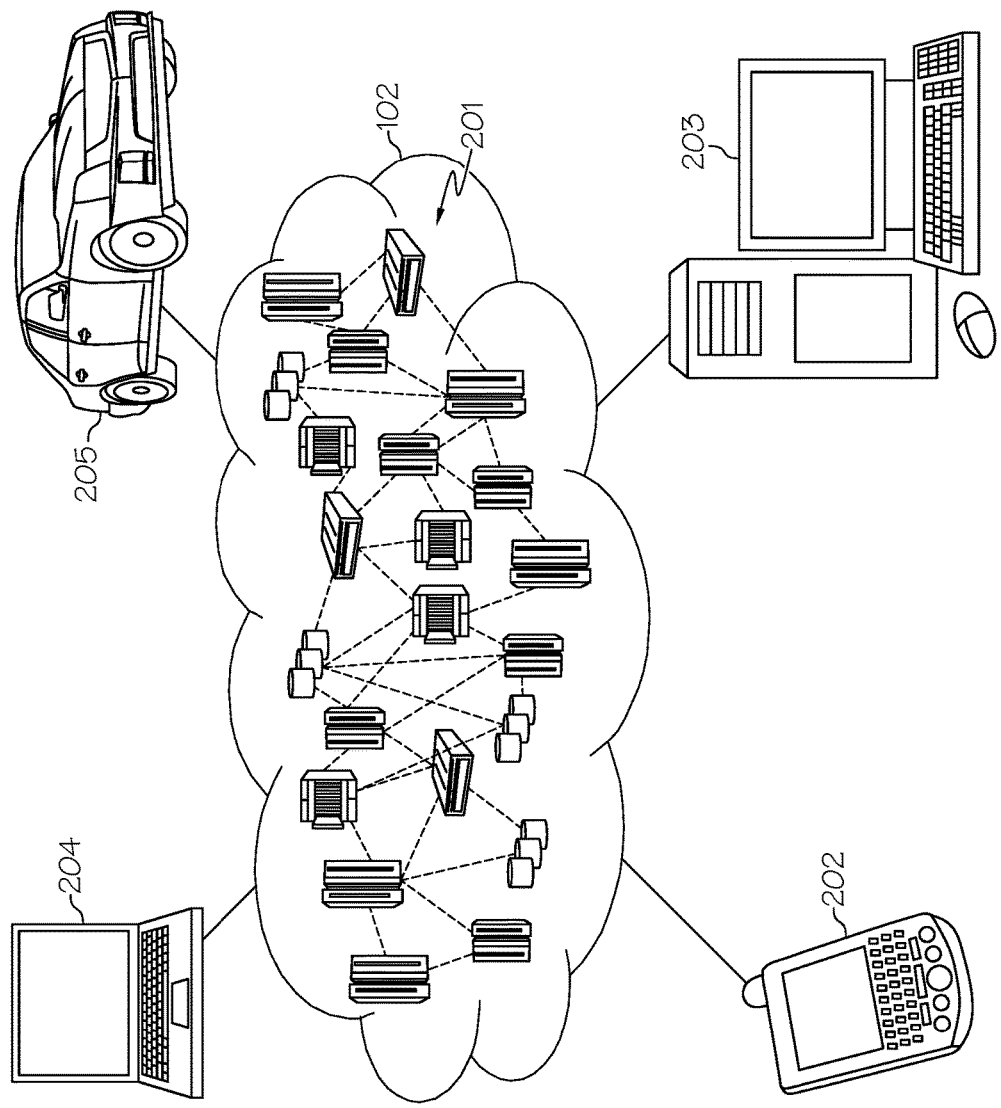
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 (also referred to as "clusters") with which local computing devices used by cloud consumers, such as, for example, Personal Digital Assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. Cloud computing nodes 201 may include one or more racks of compute nodes (e.g., servers) that are managed by a server (referred to herein as the "administrative server") in cloud computing environment 102 as discussed below in greater detail in connection with FIG. 4.

It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of nodes 201 may be stored on a computer recordable storage medium in one of nodes 201 and downloaded to computing devices 202, 203, 204, 205 over a network for use in these computing devices. For example, a server computer in computing nodes 201 may store program code on a computer readable storage medium on the server computer. The server computer may download the program code to computing device 202, 203, 204, 205 for use on the computing device.

Figure 3:
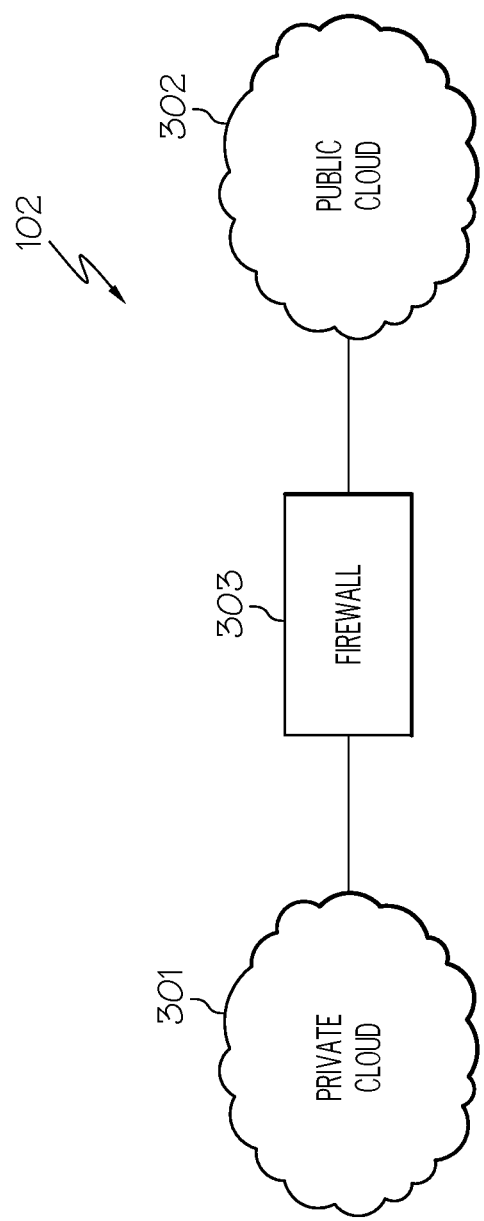
FIG. 3 illustrates a hybrid cloud topology that consists of a private cloud and a private cloud in accordance with an embodiment of the present invention.

As discussed above, cloud computing environment 102 may exhibit a hybrid cloud topology, such as a hybrid cloud topology that consists of a private cloud and a private cloud as shown in FIG. 3 in accordance with an embodiment of the present invention.

Referring now to FIG. 3, cloud computing environment 102 may exhibit a hybrid cloud topology that consists of a private cloud 301 and a public cloud 302. As discussed above, private cloud 301 has an infrastructure provisioned for exclusive use by a single organization comprising multiple consumers (e.g., business units). As also discussed above, public cloud 302 has an infrastructure provisioned for open use by the general public. In one embodiment, private cloud 301 is protected from public access, such as by way of a firewall 303.

As discussed in the Background section, in a hybrid cloud topology, such as shown in FIG. 3, "cloud bursting" or "capacity scale out" may occur when an application workload (referring to the amount of processing that a hardware component has been given to do at a given time) experiences a peak load condition. "Cloud bursting" or "capacity scale out" refers to adding additional capacity, such as on the public cloud, to service the application workload. For example, in the hybrid cloud topology consisting of a private cloud and a public cloud, the private cloud may be running low on resources or needs to reserve the resources to service another higher priority workload. As a result, additional resources, such as servers to run virtual machines, may need to be utilized on the public cloud to help service the application workload. When a workload scales out to public cloud resources, a portion of the workload may be running in the private cloud and another portion of the workload may be running in the public cloud. Virtual machines servicing such a workload that are running in the public cloud will likely need to communicate with the virtual machines in the private cloud in order to complete request transactions. This cross-cloud communication (network input/output communications between the virtual machines on different clouds) is not ideal because the external link between the public/private clouds is slower and less reliable than internal links within a cloud thereby diminishing runtime performance for the application workload. Unfortunately, there is not currently a means for minimizing the network input/output communications between the two cloud environments (i.e., the private and public clouds) during "cloud bursting" or "capacity scale out" to optimize runtime performance of the application workload.

Figure 4:
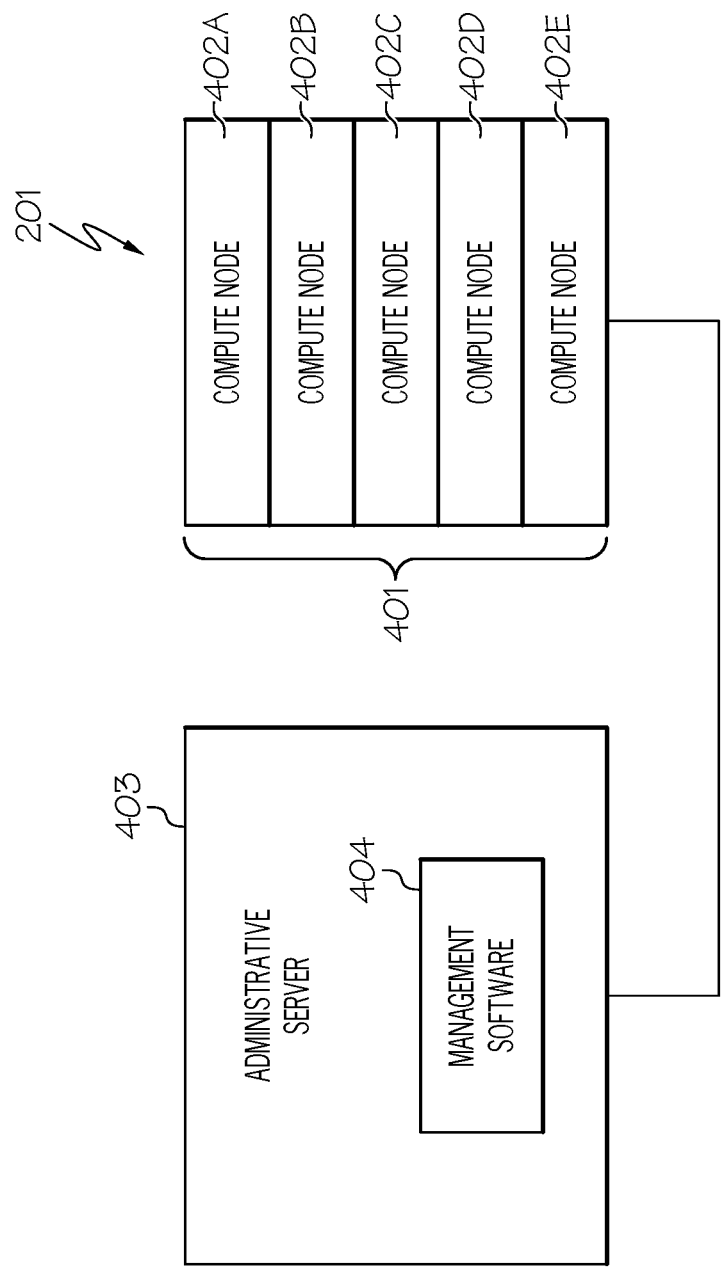
FIG. 4 illustrates a schematic of a rack of compute nodes of the cloud computing node that is managed by an administrative server in accordance with an embodiment of the present invention.
Figure 5:
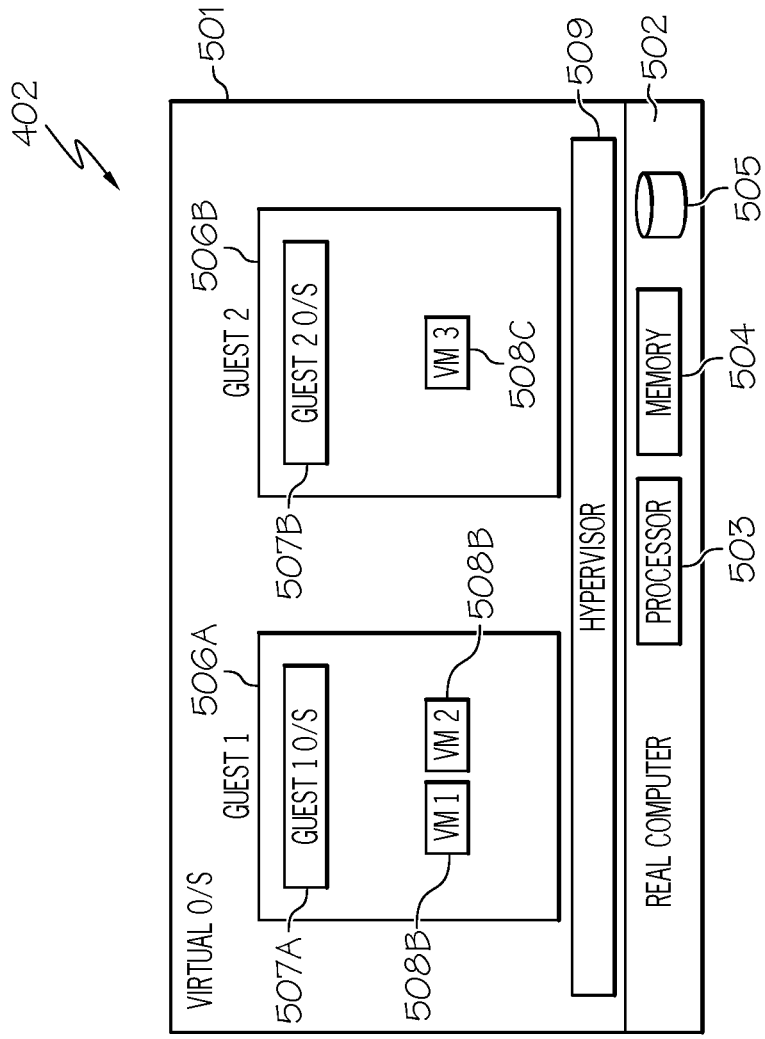
FIG. 5 illustrates a virtualization environment for a compute node in accordance with an embodiment of the present invention.
Figure 6:
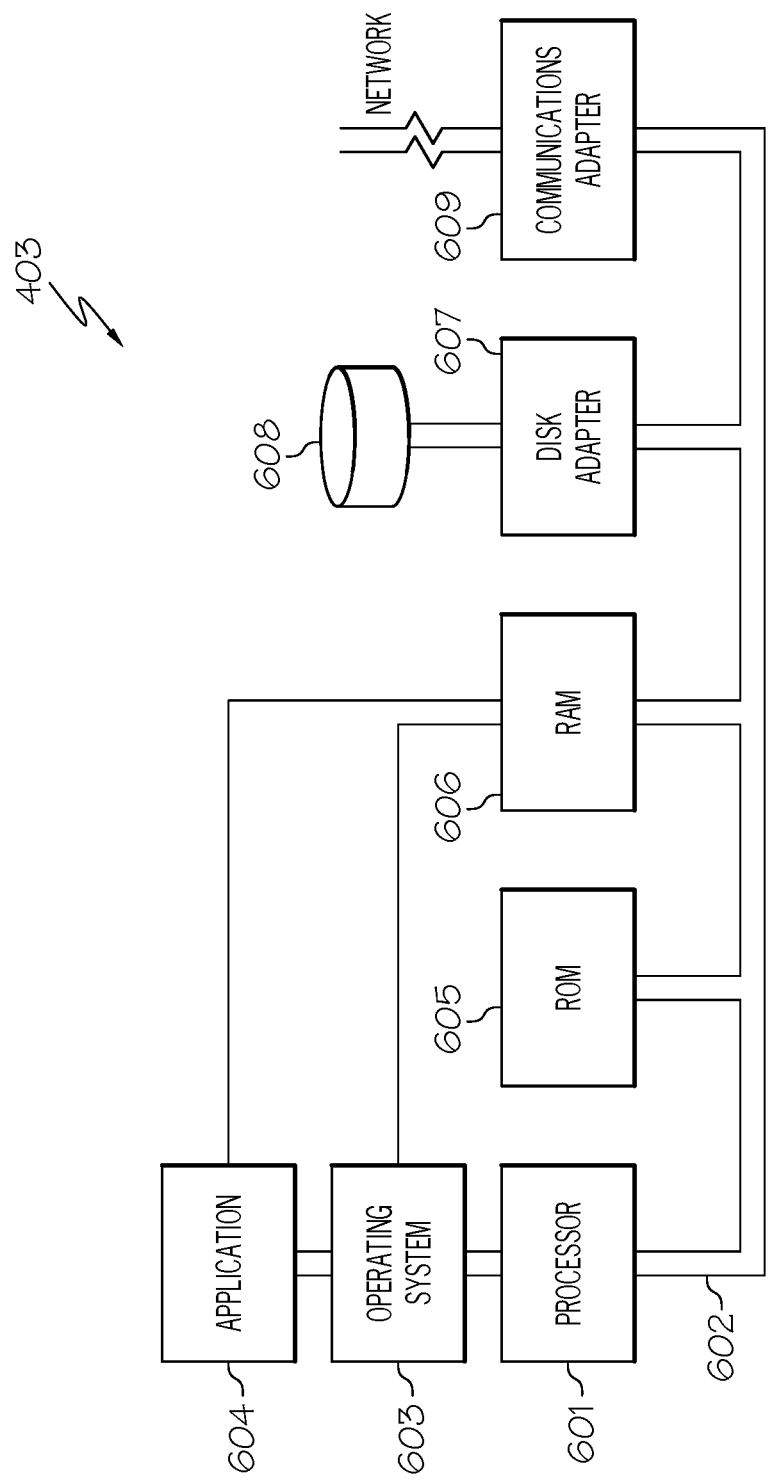
FIG. 6 illustrates a hardware configuration of an administrative server in the private cloud configured in accordance with an embodiment of the present invention.
Figure 7:
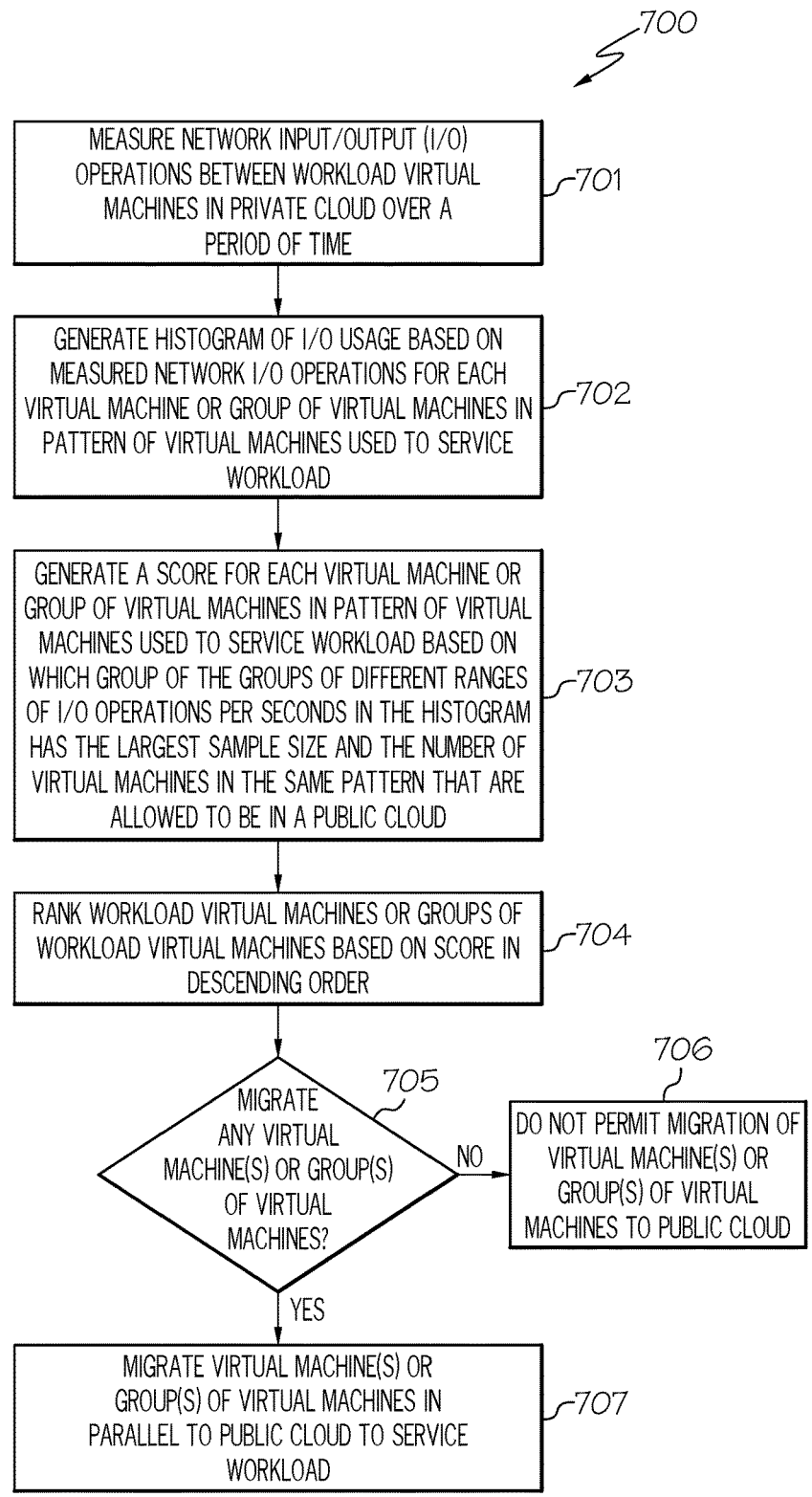
FIG. 7 is a flowchart of a method for optimizing runtime performance of an application workload in a hybrid cloud topology by minimizing the network input/output communications between the private and public clouds during "cloud bursting" or "capacity scale out" based on the network degree of traffic between the workload virtual machines in accordance with an embodiment of the present invention.
Figure 8:
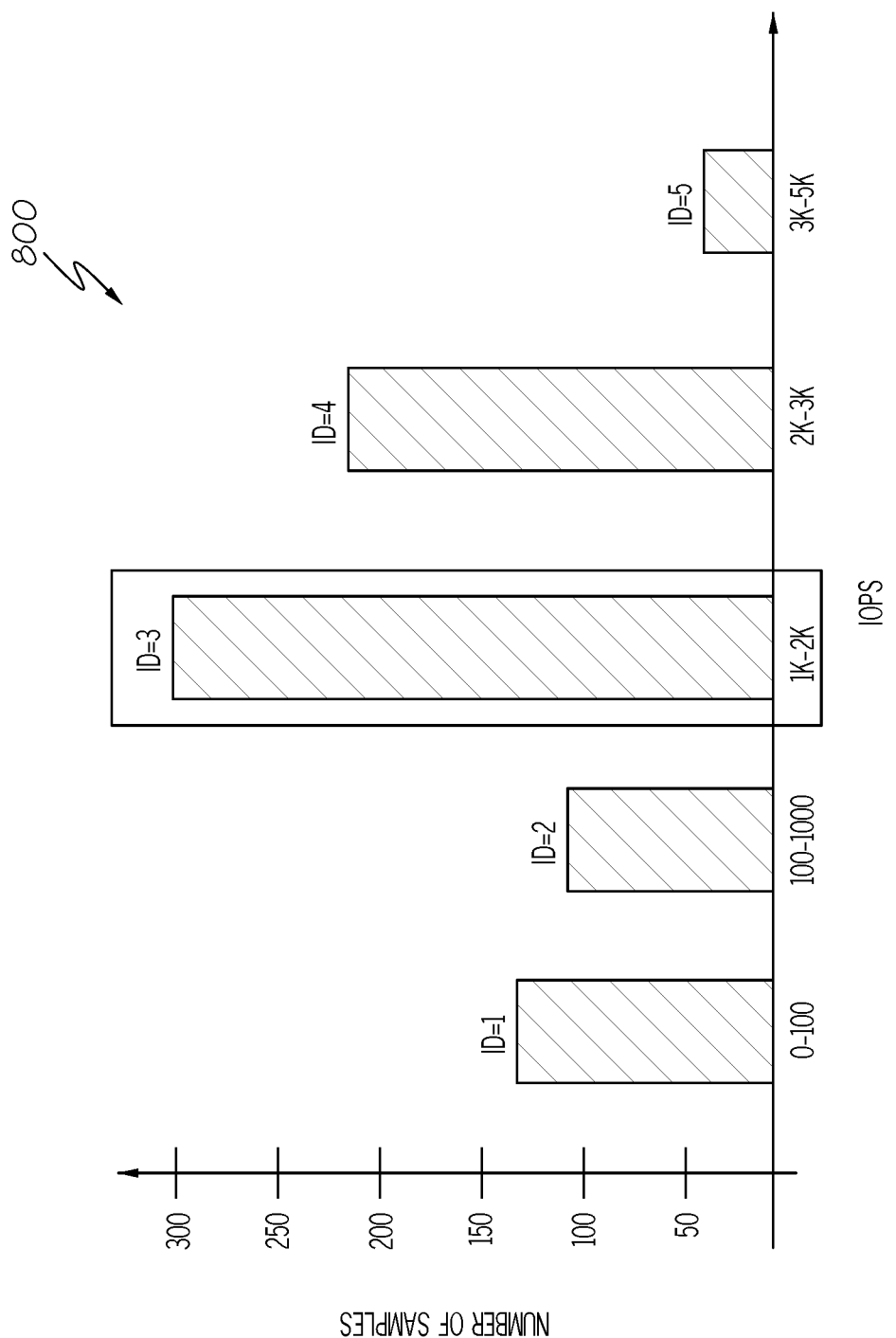
FIG. 8 is a histogram illustrating the number of samples in the different ranges of network input/output operations per second that were measured for the workload virtual machine or group of workload virtual machines in accordance with an embodiment of the present invention.

The principles of the present invention provide a means for minimizing the network input/output communications between the private and public clouds 301, 302 (FIG. 3) during "cloud bursting" or "capacity scale out" to optimize runtime performance of the application workload by migrating virtual machines from private cloud 301 to public cloud 302 based on the network degree of traffic between the workload virtual machines as discussed further below in connection with FIGS. 4-8. FIG. 4 illustrates a schematic of a rack of compute nodes of the cloud computing node that is managed by an administrative server in the private cloud. FIG. 5 illustrates a virtualization environment for a compute node. FIG. 6 illustrates a hardware configuration of the administrative server in the private cloud. FIG. 7 is a flowchart of a method for optimizing runtime performance of an application workload in a hybrid cloud topology by minimizing the network input/output communications between the private and public clouds 301, 302 during "cloud bursting" or "capacity scale out" based on the network degree of traffic between the workload virtual machines. FIG. 8 is a histogram illustrating the number of samples in the different ranges of network input/output operations per second that were measured for the workload virtual machine or group of workload virtual machines.

Referring now to FIG. 4, FIG. 4 illustrates a schematic of a rack of compute nodes (e.g., servers) of a cloud computing node 201 (FIG. 2) that are managed by an administrative server in private cloud 301 (FIG. 3) in accordance with an embodiment of the present invention.

As shown in FIG. 4, cloud computing node 201 may include a rack 401 of hardware components or "compute nodes," such as servers or other electronic devices. For example, rack 401 houses compute nodes 402A-402E. Compute nodes 402A-402E may collectively or individually be referred to as compute nodes 402 or compute node 402, respectively. An illustrative virtualization environment for compute node 402 is discussed further below in connection with FIG. 5. FIG. 4 is not to be limited in scope to the number of racks 401 or compute nodes 402 depicted. For example, cloud computing node 201 may be comprised of any number of racks 401 which may house any number of compute nodes 402. Furthermore, while FIG. 4 illustrates rack 401 housing compute nodes 402, rack 401 may house any type of computing component that is used by cloud computing node 201. Furthermore, while the following discusses compute node 402 being confined in a designated rack 401, it is noted for clarity that compute nodes 402 may be distributed across cloud computing environment 102 (FIGS. 1-3).

As further shown in FIG. 4, rack 401 is coupled to an administrative server 403 configured to provide data center-level functions. Administrative server 403 supports a module, referred to herein as the management software 404, that can be used to manage all the compute nodes 402 of cloud computing node 201, monitor system utilization, intelligently deploy images of data and optimize the operations of cloud computing environment 102. Furthermore, management software 404 may be used to minimize the network input/output communications between the private and public clouds 301, 302 (FIG. 3) during "cloud bursting" or "capacity scale out" to optimize runtime performance of the application workload by migrating virtual machines from private cloud 301 to public cloud 302 based on the network degree of traffic between the workload virtual machines as discussed further below. A description of the hardware configuration of administrative server 403 is provided further below in connection with FIG. 6.

Referring now to FIG. 5, FIG. 5 illustrates a virtualization environment for compute node 402 (FIG. 4) in accordance with an embodiment of the present invention. Compute node 402 includes a virtual operating system 501. Operating system 501 executes on a real or physical computer 502. Real computer 502 includes one or more processors 503, a memory 504 (also referred to herein as the host physical memory), one or more disk drives 505 and the like. Other components of real computer 502 are not discussed herein for the sake of brevity.

Virtual operating system 501 further includes user portions 506A-506B (identified as "Guest 1" and "Guest 2," respectively, in FIG. 5), referred to herein as "guests." Each guest 506A, 506B is capable of functioning as a separate system. That is, each guest 506A-506B can be independently reset, host a guest operating system 507A-507B, respectively, (identified as "Guest 1 O/S" and "Guest 2 O/S," respectively, in FIG. 5) and operate with different programs. An operating system or application program running in guest 506A, 506B appears to have access to a full and complete system, but in reality, only a portion of it is available. Guests 506A-506B may collectively or individually be referred to as guests 406 or guest 406, respectively. Guest operating systems 507A-507B may collectively or individually be referred to as guest operating systems 507 or guest operating system 507, respectively.

Each guest operating system 507A, 507B may host one or more virtual machine applications 508A-508C (identified as "VM 1," "VM 2" and "VM 3," respectively, in FIG. 5), such as Java™ virtual machines. For example, guest operating system 507A hosts virtual machine applications 508A-508B. Guest operating system 507B hosts virtual machine application 508C. Virtual machines 508A-508C may collectively or individually be referred to as virtual machines 508 or virtual machine 508, respectively.

Virtual operating system 501 further includes a common base portion 509, referred to herein as a hypervisor. Hypervisor 509 may be implemented in microcode running on processor 503 or it may be implemented in software as part of virtual operating system 501. Hypervisor 509 is configured to manage and enable guests 506 to run on a single host.

As discussed above, virtual operating system 501 and its components execute on physical or real computer 502. These software components may be loaded into memory 504 for execution by processor 503.

The virtualization environment for compute node 402 is not to be limited in scope to the elements depicted in FIG. 5. The virtualization environment for compute node 402 may include other components that were not discussed herein for the sake of brevity.

Referring now to FIG. 6, FIG. 6 illustrates a hardware configuration of administrative server 403 (FIG. 4) in private cloud 301 (FIG. 3) which is representative of a hardware environment for practicing the present invention. Administrative server 403 has a processor 601 coupled to various other components by system bus 602. An operating system 603 runs on processor 601 and provides control and coordinates the functions of the various components of FIG. 6. An application 604 in accordance with the principles of the present invention runs in conjunction with operating system 603 and provides calls to operating system 603 where the calls implement the various functions or services to be performed by application 604. Application 604 may include, for example, a program (e.g., management software 404 of FIG. 4) for minimizing the network input/output communications between the private and public clouds 301, 302 (FIG. 3) during "cloud bursting" or "capacity scale out" to optimize runtime performance of the application workload by migrating virtual machines 508 (FIG. 5) from private cloud 301 to public cloud 302 based on the network degree of traffic between the workload virtual machines 508 as discussed further below in association with FIGS. 7 and 8.

Referring again to FIG. 6, read-only memory ("ROM") 605 is coupled to system bus 602 and includes a basic input/output system ("BIOS") that controls certain basic functions of administrative server 403. Random access memory ("RAM") 606 and disk adapter 607 are also coupled to system bus 602. It should be noted that software components including operating system 603 and application 604 may be loaded into RAM 606, which may be administrative server's 403 main memory for execution. Disk adapter 607 may be an integrated drive electronics ("IDE") adapter that communicates with a disk unit 608, e.g., disk drive. It is noted that the program for minimizing the network input/output communications between the private and public clouds 301, 302 during "cloud bursting" or "capacity scale out" to optimize runtime performance of the application workload by migrating virtual machines 508 from private cloud 301 to public cloud 302 based on the network degree of traffic between the workload virtual machines 508, as discussed further below in association with FIGS. 6 and 7, may reside in disk unit 608 or in application 604.

Administrative server 403 may further include a communications adapter 609 coupled to bus 602. Communications adapter 609 interconnects bus 602 with an outside network (e.g., network 103 of FIG. 1).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As discussed above, FIG. 7 is a flowchart of a method 700 for optimizing runtime performance of an application workload in a hybrid cloud topology by minimizing the network input/output communications between the private and public clouds 301, 302 (FIG. 3) during "cloud bursting" or "capacity scale out" based on the network degree of traffic between the workload virtual machines 508 (FIG. 5) in accordance with an embodiment of the present invention.

Referring now to FIG. 7, in conjunction with FIGS. 1-6, in step 701, administrative server 403 measures the network input/output (I/O) operations between workload virtual machines 508 in private cloud 301 over a period of time. That is, administrative server 403 measures the network input/output (I/O) operations between virtual machines 508 of a pattern of virtual machines 508 servicing the application workload in private cloud 301 over a period of time. An "application workload," as used herein, refers to the amount of processing that a hardware component has been given to do at a given time. A "pattern" of virtual machines refers to the collection of virtual machines 508 used to perform the required processing of the application workload. Such virtual machines 508 may also be referred to as "workload virtual machines."

In step 702, administrative server 403 generates a histogram of I/O usage based on the measured network I/O operations for each virtual machine 508 or group of virtual machines 508 in the pattern of virtual machines 508 used to service the application workload. As will be discussed in further detail below, method 700 may be used to identify the virtual machine(s) 508 or group(s) of virtual machines 508 to be migrated to public cloud 302 from private cloud 301. By identifying those virtual machine(s) 508 or group(s) of virtual machines 508 that have the highest network I/O operations between workload virtual machines 508, those virtual machine(s) 508 or group(s) of virtual machines 508 are more likely to be migrated to public cloud 302. Furthermore, as discussed further below, by taking into consideration the number of virtual machines 508 in the pattern of virtual machines 508 used to service the application workload, those virtual machines 508 or groups of virtual machines 508 that interact with each other the most may be migrated to public cloud 302 thereby reducing the cross-cloud communication.

A group(s) of virtual machines 508 may be identified to be migrated to public cloud 302 to take into consideration the scenario of when there is a high level of communication between specific workload virtual machines 508 and it would be advantageous to migrate those specific workload virtual machines 508 to public cloud 302 to reduce the I/O overhead incurred from cross-cloud communication. For example, there may be a high level of communication between an application server virtual machine 508 and a database virtual machine 508. It may be advantageous to burst this pair of virtual machines 508 to public cloud 302 so long as the I/O operations between the virtual machines 508 do not span cloud boundaries. For example, bursting one of these virtual machines 508 to public cloud 302 would result in poor performance and high cost if there is still a significant amount of communication with a virtual machine(s) 508 in private cloud 301. Such a situation would be prevented using the principles of the present invention discussed below. However, bursting both virtual machines 508 as an atomic unit would reduce the I/O overhead incurred from cross-cloud communication as well as allow the resources in private cloud 301 to service other workloads.

A histogram of the I/O usage based on the measured network I/O operations for each virtual machine 508 or group of virtual machines 508 in the pattern of virtual machines 508 used to service the application workload is discussed below in connection with FIG. 8.

FIG. 8 is a histogram 800 illustrating the number of samples in the different ranges of network input/output operations per second (e.g., 0-100, 100-1,000, 1,000-2,000, 2,000-3,000 and 3,000-5,000) that were measured for the virtual machine 508 or group of virtual machines 508 in accordance with an embodiment of the present invention.

Referring to FIG. 8, histogram 800 depicts the number of samples measured in the different ranges of network I/O operations per second. As will be discussed further below, such information may be used to compute a score that is used to determine which, if any, virtual machine 508 or group of virtual machines 508 is to be migrated to public cloud 302 to handle a cloud burst.

Returning to FIG. 7, in conjunction with FIGS. 1-6 and 8, in step 703, administrative server 403 generates a score for each virtual machine 508 or group of virtual machines 508 used to service the application workload based on which group of the groups of different ranges of I/O operations per seconds (IOPS) in histogram 800 has the largest sample size and the number of virtual machines 508 in the same pattern that are allowed to be in public cloud 302. Such a score is used to identify the candidate virtual machine(s) 508 or group(s) of virtual machine(s) 508 to be migrated to public cloud 302. In one embodiment, the score may be computed using the following equation:

$$W = (\alpha_1 w_1 + \alpha_2 w_2) * w_3 \quad \text{(EQ 1)}$$

where $w_1$ corresponds to the group or "bucket" of the groups of different ranges of I/O operations per seconds as depicted in histogram 800 that has the largest sample size; $w_2$ corresponds to the number of virtual machines 508 in the pattern of virtual machines 508 servicing the application workload that are allowed to be in public cloud 302; $w_3$ is a parameter indicating whether virtual machine 508 or a group of virtual machines 508 is allowed to be scaled out to public cloud 302 (set to the value of zero if virtual machine 508 or a group of virtual machines 508 is not allowed to be scaled out to public cloud 302 or set to the value of 1 if virtual machine 508 or a group of virtual machines 508 is allowed to be scaled out to public cloud 302); $\alpha_1$ is a user designated weight; $\alpha_2$ is a second user designated weight, where $\alpha_1+\alpha_2=1$.

Referring to FIG. 8, each grouping or "bucket" of ranges is designated with a value of 1 . . . n, where n is the number of groups or buckets. As illustrated in FIG. 8, there are five groups of ranges so each group is identified ("ID") with a value between 1 and 5. For example, the group with the lowest I/O usage is identified with the value of 1 (e.g., range of 0-100 IOPS is assigned ID=1); whereas, the group with the highest I/O usage is identified with the value of 5 (e.g., range of 3,000-5,000 IOPS is assigned ID=5). In this manner, the group with the highest IOPS will be weighted higher than the group with the lowest IOPS thereby allowing the migration of virtual machine(s) 508 or group(s) of virtual machines 508 that exhibit high I/O operations. As illustrated in FIG. 8, the range of 0-100 IOPS is assigned the identification ("ID") of 1; the range of 100-1,000 IOPS is assigned the identification of 2; the range of 1,000-2,000 IOPS is assigned the identification of 3; the range of 2,000-3,000 IOPS is assigned the identification of 4; and the range of 3,000-5,000 IOPS is assigned the identification of 5. The value of $w_1$ in Equation 1 is the ID of the group or bucket of a range of IOPS that has the largest sample size. In the example illustrated in FIG. 8, the group with the largest number of samples corresponds to the group (ID=3) containing the number of samples for the range of 1,000-2,000 IOPS. Hence, in this example, $w_1$ equals the value of 3.

As discussed above, $w_2$ corresponds to the number of virtual machines 508 in the pattern of virtual machines 508 servicing the application workload that are allowed to be in public cloud 302. The higher the value of $w_2$ the more likely that multiple virtual machines 508 or groups of virtual machines 508 will be migrated in parallel to public cloud 302 as discussed further below.

As also discussed above, $w_3$ is a parameter indicating whether virtual machine 508 or a group of virtual machines 508 is allowed to be scaled out to public cloud 302. $w_3$ is set to the value of zero if virtual machine 508 or a group of virtual machines 508 is not allowed to be scaled out to public cloud 302 or set to the value of 1 if virtual machine 508 or a group of virtual machines 508 is allowed to be scaled out to public cloud 302. In one embodiment, a determination is made by administrative server 403 as to whether a workload policy permits the migration of the virtual machine 508 or a group of virtual machines 508 to public cloud 302. Workload policies may be in place to prevent certain virtual machines 508 from bursting to public cloud 302. For example, an administrator may attach a non-burst policy to a particular database that contains sensitive information. If virtual machine 508 or a group of virtual machines 508 is not allowed to be scaled out to public cloud 302, then administrative server 403 sets the value of $w_3$ to 0 thereby rendering the score (value of W) for the virtual machine 508 or group of virtual machines 508 to be 0. Otherwise, if virtual machine 508 or a group of virtual machines 508 is allowed to be scaled out to public cloud 302, then administrative server 403 sets the value of $w_3$ to 1.

Returning to FIG. 7, in conjunction with FIGS. 1-6 and 8, in step 704 administrative server 403 ranks the workload virtual machines 508 or groups of workload virtual machines 508 based on the score assigned to each workload virtual machine 508 or group of workload virtual machines 508, respectively, in descending order. As a result, virtual machines 508 or groups of virtual machines 508 with the higher ranking are more favorable for migration than other virtual machines 508 or groups of virtual machines 508.

In step 705, a determination is made by administrative server 403 as to whether to migrate any virtual machine(s) 508 or group(s) of virtual machine(s) 508 based on their assigned score in step 703. In one embodiment, the determination is based on comparing the score generated in step 703 with a threshold value, which may be user selected.

If the score is less than a threshold value, then, in step 706, administrative server 403 does not permit the migration of virtual machine(s) 508 or group(s) of virtual machines 508 to public cloud 302 to service the application workload.

If, however, the score is greater than a threshold value, then, in step 707, administrative server 403 migrates the virtual machine(s) 508 or group(s) of virtual machines 508 in parallel to public cloud 302 to service the application workload. By migrating virtual machine(s) 508 or group(s) of virtual machines 508 to public cloud 302 during "cloud bursts" or "capacity scale out" based on the network degree of traffic between the workload virtual machines 508, runtime performance of the application workload is improved by minimizing the network input/output communications between private and public clouds 301, 302 thereby more effectively responding to spikes in the load. Network input/output communications are minimized between private and public clouds 301, 302 by migrating those virtual machine(s) 508 or group(s) of virtual machines 508 with the highest I/O rates as well as those that interact with each other the most to public cloud 302. Furthermore, by migrating the virtual machine(s) 508 or group(s) of virtual machines 508 in parallel (concurrently), I/O communication between cloud environments 301, 302 is further minimized.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for optimizing runtime performance of an application workload in a hybrid cloud topology, the method comprising:

measuring network input/output (I/O) operations between virtual machines of a pattern of virtual machines servicing said application workload in a private cloud over a period of time;

generating, by a processor, a score for each of a plurality of virtual machines or for each group of a plurality of groups of virtual machines in said pattern of virtual machines used to service said application workload based on a highest number of samples within a range of I/O operations per second using said measured network I/O operations and a number of virtual machines in said pattern of virtual machines that are allowed to be in a public cloud;

ranking each of said plurality of virtual machines or each group of said plurality of groups of virtual machines in said pattern of virtual machines based on said score; and migrating one or more of said plurality of virtual machines or one or more groups of said plurality of groups of virtual machines in said pattern of virtual machines to said public cloud to service said application workload in response to said score for said one or more of said plurality of virtual machines or for said one or more groups of said plurality of groups of virtual machines in said pattern of virtual machines exceeding a threshold value.

2. The method as recited in claim 1 further comprising:

generating a histogram of I/O usage for each of said plurality of virtual machines or for each group of said plurality of groups of virtual machines in said pattern of virtual machines comprising groups of different ranges of I/O operations per second using said measured network I/O operations.

3. The method as recited in claim 1, wherein said one or more of said plurality of virtual machines or said one or more groups of said plurality of groups of virtual machines in said pattern of virtual machines are migrated to said public cloud in parallel.

4. The method as recited in claim 1 further comprising:

migrating said one or more of said plurality of virtual machines or said one or more groups of said plurality of groups of virtual machines in said pattern of virtual machines to said public cloud to service said application workload in response to said score for said one or more of said plurality of virtual machines or for said one or more groups of said plurality of groups of virtual machines in said pattern of virtual machines exceeding said threshold value and in response to a workload policy permitting said migration of said one or more of said plurality of virtual machines or said one or more groups of said plurality of groups of virtual machines in said pattern of virtual machines to said public cloud.

* * * * *